United States Patent [19]

Granberg

[11] 4,012,969

[45] Mar. 22, 1977

[54] ADJUSTABLE CHAINSAW FILE GUIDE AND HOLDER

[76] Inventor: Elof Granberg, 21 Privateer Drive, Corte Madera, Calif. 94925

[22] Filed: Nov. 10, 1975

[21] Appl. No.: 630,734

[52] U.S. Cl. .................................. 76/36; 29/80
[51] Int. Cl.² ....................................... B23D 63/12
[58] Field of Search ............... 29/78, 80; 76/36, 88

[56] References Cited

UNITED STATES PATENTS

| | | | |
|---|---|---|---|
| 3,327,567 | 6/1967 | Penberthy | 76/36 |
| 3,518,900 | 7/1970 | Ehlen et al. | 76/36 |
| 3,901,105 | 8/1975 | Ayer | 76/36 |

FOREIGN PATENTS OR APPLICATIONS

| | | | |
|---|---|---|---|
| 62,965 | 10/1940 | Norway | 76/36 |

Primary Examiner—Leonidas Vlachos
Attorney, Agent, or Firm—Bruce & McCoy

[57] ABSTRACT

An adjustable chainsaw file guide and holder comprised of a frame formed of stamped sheet metal including a V-shaped guide surface portion and a handle portion, two clamping members slidably engaged with and adjustable along the guide surface portion of the frame for securing any one of different length chainsaw files in spaced alignment with the guide surfaces, and a means within said clamping members for positively centering any one of different standard diameter chainsaw files with respect to the vertex of the V formed by the guide surfaces.

5 Claims, 6 Drawing Figures

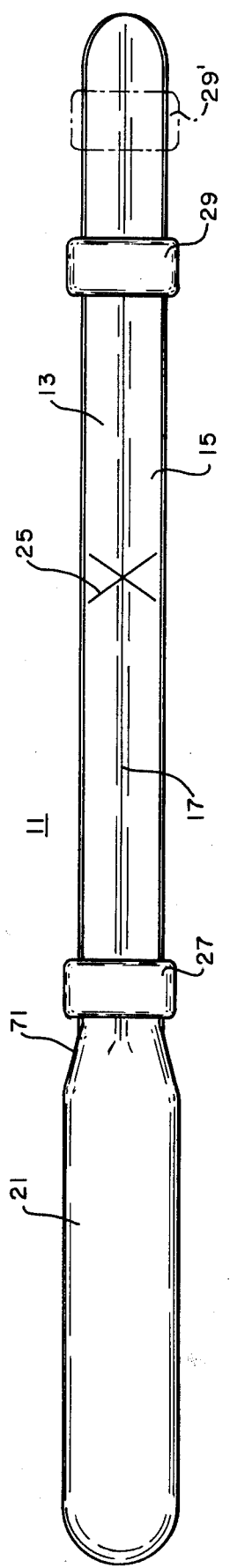
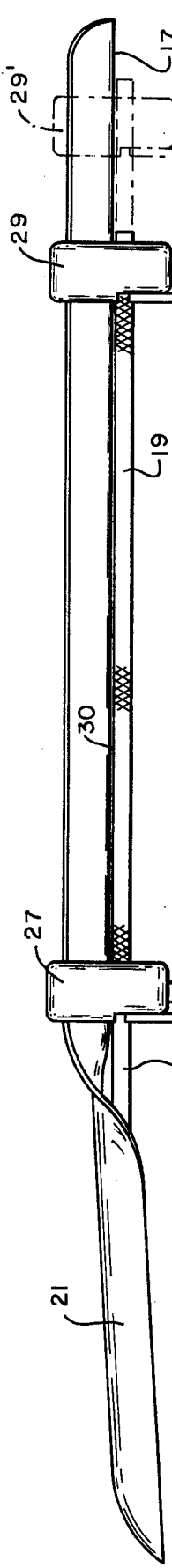
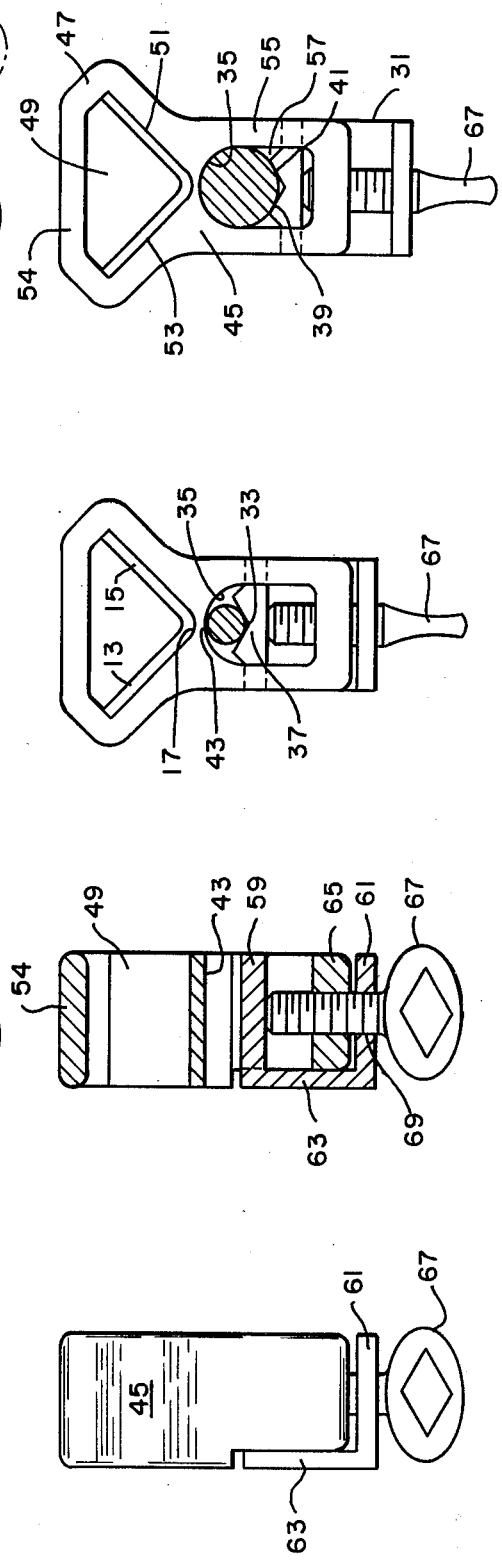
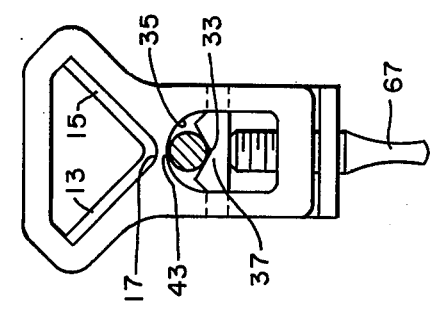
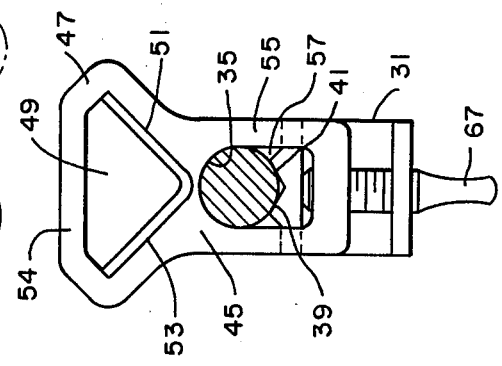

ADJUSTABLE CHAINSAW FILE GUIDE AND HOLDER

BACKGROUND OF THE INVENTION

1. Field of Invention

The present invention relates to devices for sharpening chainsaws and more particularly to an adjustable chainsaw file guide and holder.

2. Description of Prior Art

It is common practice in the industry to use a round file to sharpen the cutting teeth of a chainsaw. Such files typically range in size from ⅛ to ¼ inches in diameter and 6 to 8 inches in length and are held in a holder such as the chainsaw file holder disclosed in U.S. Pat. No. 3,867,853 to John Lawless. Such file holders facilitate the holding and guiding of the file during the sharpening operation.

One disadvantage with the Lawless device and other presently used filed holders is that the space between file clamping points is fixed and hence separate holders of different lengths must be used to clamp the ends of different length files. It is also advantageous to be able to successively clamp different sections of a chainsaw file or to shorten up clamping point spacing to prevent file bending. Being non-adjustable, Lawless and other existing file holders do not have this capability.

The present invention overcomes the above-described disadvantages by providing an adjustable file guide and holder which is capable of having its file clamping points adjusted relative to each other to anywhere along the length of the file being held. This adjustability feature eliminates the need for separate holders for different length files and also allows different portions of the file to be successively used.

Another disadvantage of the Lawless file holder is that the thumb screw 25 which secures or clamps the tang end of the file tends to cock the file to one side of the vertex of the guide surfaces as the flat end of the thumb screw is rotated tightly against the file. The present invention overcomes this problem by providing a locking mechanism which will not cock the file to one side or the other, but will instead positively center the file beneath the aforementioned guide surface vertex.

The present invention also provides a degree of safety and economy not found in the prior art. Heretofore, file guide holders have consisted of a single machined body portion having set screws. In these prior art devices, the tang end of the file with its file handle extends beyond one end of the holder. If the handle of the file were to break off under downward pressure during the filing operation, as has been known to occur, a hand injury such as a puncture wound almost certainly would follow. To protect against this possibility the present invention provides a special handle portion formed on the frame of the holder. Also, since the integral body is formed of a stamped part, the more costly machined frames of prior art devices have been eliminated.

SUMMARY OF INVENTION

The present invention is an adjustable chainsaw file guide and holder comprised of a frame formed of stamped sheet metal. The frame consists of two portions with the first portion having a uniform cross section therealong and forming a pair of straight guide surfaces angled with respect to each other; the guide surfaces so formed lie in a plane parallel to the axis of file secured in the frame. The second portion of the frame forms a handle which partially surrounds the tang of the file when secured in the frame. At least two clamping members are provided which slidably engage and are adjustable along the first portion of the frame for securing variable length chainsaw files in spaced alignment with the vertex of said intersecting guide surface planes.

OBJECTS OF INVENTION

It is therefore an object of the present invention to provide an adjustable chainsaw file guide and holder wherein a single device can secure different standard length chainsaw files.

It is another object ot the present invention to provide an adjustable chainsaw file guide and holder wherein different portions of a chainsaw file can be successively used or the spacing of clamping points can be shortened to prevent bending of smaller diameter files.

It is a further object of the present invention to provide an adjustable file guide and holder which in addition is adjustable to secure any one of different standard diameter chainsaw files at a fixed distance from and in alignment with the file guide surfaces.

It is still another object of the present invention to provide an adjustable file guide and holder wherein the chainsaw file is positively centered with respect to the vertex of the intersecting file guide surfaces.

It is still a further object of the present invention to provide an adjustable chainsaw file guide and holder which protects against hand injuries due to breaking away of the file handle.

And it is yet another object of the present invention to provide an adjustable chainsaw file guide and holder which can be cheaply manufactured from a stamped part and yet accurately aligns and centers the chainsaw file with respect to the guide surfaces.

Other objects of the present invention will become apparent from the following specification and claims.

DESCRIPTION OF DRAWINGS

FIG. 1 is a top plan view of an adjustable file guide and holder according to the present invention.

FIG. 2 is a side elevation view of the adjustable file guide and holder shown in FIG. 1.

FIG. 3 is an end elevation view of a clamping member used in connection with the present invention.

FIG. 4 is a cross-sectional view of the clamping members shown in FIG. 3.

FIG. 5 is a front elevational view of the clamping member shown in FIGS. 3 and 4 holding a small diameter chainsaw file.

FIG. 6 is a front elevational view of the clamping member shown in FIG. 5 holding a large diameter chainsaw file.

DESCRIPTION OF THE PREFERRED EMBODIMENT

The present invention is an adjustable chainsaw file guide and holder which can be adjusted to hold chainsaw files of both different lengths and diameters with maximum stability and with the file being aligned and centered relative to the holder's file guide surfaces.

Referring now to the drawings, the adjustable file guide and holder of the present invention comprises an elongated frame 11 formed of stamped sheet metal and having two portions. The first portion is of uniform cross-section and essentially defines a pair of generally flat guide surfaces 13 and 15 which angle to intersect in a V-shape. The line of intersection of these two guide surfaces define vertex 17 in relation to which the chainsaw file 19 can be secured as hereinafter described. The second portion of the frame defines a handle 21 of reverse concavity from the first portion of the frame so as to cover the tang portion of the file which protrudes beyond vertex 17 of guide surfaces 13 and 15. As best seen in FIG. 2, the handle portion is generally curved along its longitudinal axis and surrounds the tang of the file to provide a suitable holding surface on which downward pressure during filing of the chainsaw teeth can be exerted. It should be noted the integral construction of the guide surfaces and handle allows the frame to be stamped from sheet metal thereby substantially reducing the per unit cost of manufacturing frame 11.

In its preferred form, the elongated frame will have indicating means 25 inscribed on the top or inside the surface of the file guide surfaces as a visual aid to the operator for properly aligning the chainsaw file with respect to the chainsaw. As is well known, the length of the chainsaw bar is aligned with the indicating means so as to achieve a proper cutting angle on the chainsaw tooth being filed. For an optimum cutting edge, the indicating means should enable the operator to orient the chain saw file guide and holder at an angle of approximately 35° with respect to the chainsaw bar.

Clamping members 27, 29 slidably engage and are adjustable along the first portion of the elongated frame 11 which define the V-shaped guide surfaces 11, 15. FIG. 2 shows the clamping members disposed apart for securing the two extreme ends of the working portion of the file with clamping member 29 being adjustable, for example, to the position shown as 29' to secure the point end of a longer file. In the manner shown, different standard length chainsaw files can be secured in spaced alignment with vertex 17 of intersecting guide surfaces 13 and 15. That is, the locus of points along the extreme diameter 30 of the file will be equidistant from the locus of points defining vertex 17. It should be noted that both clamping members are adjustable along the entire length of the guide surfaces so that either clamping member can be adjusted according to a particular file's length and condition or for successively using different portions of the file or for shortening up the filing surface to prevent bending with smaller diameter files. Preferably, clamping member 27 is urged to wedge against the handle portion so as to prevent the file and clamping members as a unit from sliding back and forth on the guide surfaces.

Clamping members 27, 29 are adapted to hold different standard diameter files, such as file 19, in spaced relationship to vertex 17 such that the distance between the extreme diameter 30 of the file and vertex 17 is contant and never changes with file diameter. In addition, there is also included a means for positively centering and aligning the file, regardless of diameter, relative to the vertex. FIG. 5 illustrates this self-centering feature with a smaller diameter file; FIG. 6 shows self-centering in connection with a larger diameter file. To achieve self-centering, locking member 31 is provided having a generally V-shaped file engaging groove 33 formed thereon. Opposite the filing engaging groove is a file cradling surface 35 disposed below and in spaced relation to where the vertex 17 of the file guide surfaces engages with the clamping members. Locking member 31 is adjustably disposed beneath cradling surface 35 such that vertex 37 of the file engaging groove aligns with vertex 17 of intersecting guide surfaces 13, 15; upward adjustment of the centering block will cause a file placed in groove 33 to be held securely by the groove's angled supporting surfaces against topmost portion 43 of cradling surface 35. As can be seen in FIGS. 5 and 6, a file of any standard diameter is entirely and immovably captured by surfaces 35, 39, 41 in centered and aligned relation with respect to the vertex 17 of the guide surfaces and because of the angle relationship of the supporting surfaces is prevented from being cocked from one side of the vertex or the other.

The preferred structure of the clamping members can more particularly be described as follows: The self-centering clamping members are comprised of a unitary sliding element 45 having an upper portion 47 and an opening 49 formed in this upper portion to allow the clamping members to slidably engage elongated frame 11 at any point along the guide surfaces 13, 15. Bottom surfaces of the opening 51, 53 form a V-shape to conform to the V-shape of guide surfaces 13, 15 thus providing a sliding and self-centering surface for the guide surfaces; cross bar 54 defining the upper portion of opening 49 acts to hold the elongated body in captured relation on surfaces 51, 53. Although the V-shape opening is shown in the drawings as being closed by cross bar 54, it is not intended that the clamping members be limited to this structure for, alternatively, opening 49 could be open ended at the top so long as a portion extends far enough to provide a shoulder of suitable length to capture the guide surfaces of the elongated body.

Projecting downward from the upper portion 47 of unitary sliding element 45 is lower portion 55 having a second opening 57 formed therein a suitable distance below opening 49. This second opening is of a size to allow any standard size chainsaw file to be inserted therethrough with the top of said opening defining file cradling surface 35. File cradling surface 35 has an arcuate contour with a radius of curvature at least twice the diameter of the largest file to be used in connection with the present invention. Since the diameters of the most commonly used files in the industry range from ⅛ to ¼ of an inch, the radius of this contour would typically be ¼ of an inch. Any standard sized chain saw file can thus be urged against the file cradling surface 35 such that the extreme top diameter 30 of the file is positioned to a fixed distance from vertex 17 of the engaged file guide surfaces.

Locking member 31 is provided to engage unitary sliding element 45 within opening 57. This locking member is comprised of upper wall 59 which is connected to lower wall 61 by side wall 63 with file engaging groove 33 being formed centrally along upper wall 59. As can be seen in FIGS. 46, the locking member is disposed such that upper wall 59 with the file engaging groove 33 formed thereon slidably extends within the second opening 57 in the lower portion of the unitary sliding element while the lower wall 61 extends beneath base 65 of lower portion 55. Screw means, such as thumb screw 67, is journalled to the lower wall 61 at 69 and extends to threadably engage base 65 whereby when the screw means is turned the locking member advances to lock and positively center file 19 between the file engaging groove 33 and the top portion 43 of the file cradling surface 35. By securing each end of the file in this manner, the file is nearly perfectly aligned and centered with respect to vertex 17 of the file guide surfaces.

To insert a chainsaw file in the adjustable file guide and holder of the present invention clamping members 27 and 29 are simply set at a spaced apart distance along the file guide surfaces determined by the length of the file to be used, and the locking members 31 of each of these clamping members retracted until an opening is provided which will allow a file to be inserted easily through the second opening 57 of the two clamping members. Once the file has been so inserted and is resting in file engaging grooves 33, the thumb screw can be turned to advance the locking member until the topmost diameter of the file engages with file cradling surface 35. To prevent the clamping members from sliding as mentioned above, the clamping members should be slid down the elongated frame until clamping member 27 wedges against the flared portion 71 formed as the handle meets with the guide surfaces. As an alternative, it would clearly be possible to provide an external means for preventing sliding if this became a problem.

The present invention provides a novel file guide and holder which is adjustable to hold chainsaw files having both different lengths and diameters and which at the same time is self-centering such that the chainsaw file is perfectly aligned in relation to the vertex of the intersecting file guide surfaces. By providing an integrally formed cupped handle, the present invention also protects against the operator losing his grip on the tang of the file or having the tang of the file or file handle break away resulting in a puncture wound to the operator's hand. The integral construction of the elongated frame also provides manufacturing economy in that it can be formed from stamped sheet metal.

Although the preferred embodiment of the present invention has been described above in considerable detail, it is not intended that it be limited to such detail except as may be necessitated by the appended claims.

What I claim is:

1. An adjustable chainsaw file guide and holder comprising
    an elongated frame having two generally flat guide surfaces angled to intersect in a V-shape, and
    at least two adjustable clamping members each having a unitary sliding element with a shaped opening formed to at least partially closely surround the guide surfaces of said elongated frame for slidably engaging same at any point therealong,
    said clamping member also including means for securing different diameter chainsaw files at any point along the length thereof and positively centering same relative to the vertex of said intersecting guide surfaces.

2. An adjustable chainsaw file guide and holder comprising
    an elongated frame having two generally flat guide surfaces angled to intersect in a V-shape, and
    at least two adjustable clamping members slidably engaging and adjustable along said frame for securing variable length chainsaw files in spaced alignment with the vertex of said intersecting guide surfaces,
    said clamping members including a locking member having a file engaging groove formed on the top thereof, and a file cradling surface disposed in spaced relation to the vertex of said file guide surfaces when said frame is engaged in said clamping members, said locking member being adjustably disposed beneath said cradling surface such that the bottom of said file engaging groove aligns with the vertex of said intersecting guide surfaces wherein by upward adjustment of the locking member a chainsaw file placed in said file engaging groove will be held securely by the groove's supporting surfaces against said file cradling surface such that the extreme diameter of said file is positioned to within a fixed distance from and in centered relation to the vertex of said guide surface.

3. The adjustable chainsaw file guide and holder of claim 2 wherein each of said clamping members comprises
    a unitary sliding element having an upper portion with an opening being formed therein for slidably engaging said frame at any point along said guide surfaces and a lower portion projecting downward generally perpendicularly from the vertex of said intersecting guide surfaces of said frame when engaged in the opening of said upper portion, said lower portion having a second opening formed therein at a suitable distance below said first opening, said second opening being of a size to allow any standard sized chainsaw file to be inserted therethrough with the top of said second opening defining a file cradling surface having an arcuate contour of a radius of curvature at least twice the diameter of the largest file to be used whereby the extreme diameter of any standard sized chainsaw file when urged against said file cradling surface is at a fixed distance from the vertex of said guide surfaces,
    a locking member having substantially parallel upper and lower walls interconnected at one end by a side wall and a file engaging groove formed on the top surface of said upper wall, said locking member being disposed with the upper wall slidably extending within said second opening and the lower wall extending beneath the base of the lower portion of said unitary sliding element, and
    a screw means jounalled to the lower wall of said locking member and threadedly engaged with the base of said lower porton whereby when said screw means is turned the locking member advances to lock and positively center said file with respect to said vertex between said file engaging groove and said file cradling surface.

4. An adjustable chainsaw file guide and holder comprising
    an elongated frame having two generally flat guide surfaces angled to intersect in a V-shape,
    at least two unitary sliding elements each having an upper portion with an opening being formed therein for slidably engaging said elongated frame at any point along said guide surfaces, and a lower portion projecting generally perpendicularly from the vertex of said intersecting guide surfaces of the elongated frame when engaged in the opening of said upper portion, said lower portion having a second opening formed therein at a suitable distance below said first opening, said second opening being of a size to allow any standard sized chainsaw file to be inserted therethrough with the top of said second opening defining a file cradling surface having an arcuate contour of a radius of curvature at least twice the diameter of the largest file to be used whereby the extreme diameter of any standard sized chainsaw file when urged against the top of said second opening is at a fixed distance from the vertex of said guide surfaces, a locking member for each of said unitary sliding elements, each locking member having substantially parallel upper and lower walls interconnected at one end by a side wall and a file engaging groove formed on the top surface of said upper wall, said locking member being disposed with the upper wall slidably extending into said second opening and the lower wall extending beneath the base of the lower portion of said unitary sliding element, and a screw means journalled with respect to said locking member and threadedly engaged with the base of the lower portion of said frame whereby when said screw means is turned the locking member advances to lock and positively center said file with respect to said vertex between said file engaging groove and said file cradling surface.

5. The adjustable chainsaw file guide and holder of claim 4 wherein said frame is formed of stamped sheet metal and includes a portion forming a handle of reverse concavity from said V-shape guide surfaces, said handle being arranged with a generally curved cross-section along its longitudinal axis for fitting the operator's hand and closed around the free end thereof to cover the end of the file tang.

* * * * *